United States Patent [19]

Sujumura et al.

[11] 4,318,777

[45] Mar. 9, 1982

[54] APPARATUS FOR DETECTING FAILURE OF THE NUCLEAR FUEL ROD

[75] Inventors: Takeshi Sujumura; Shozo Saito; Takashi Saito; Hiromasa Hirakawa, all of Hitachi, Japan

[73] Assignee: Hitachi, Ltd., Tokyo, Japan

[21] Appl. No.: 85,951

[22] Filed: Oct. 18, 1979

[30] Foreign Application Priority Data

Oct. 20, 1978 [JP] Japan ................................ 53/128505

[51] Int. Cl.³ .............................................. G21C 17/00
[52] U.S. Cl. .................................................... 376/253
[58] Field of Search ......................... 176/19 R, 19 LD

[56] References Cited

U.S. PATENT DOCUMENTS

| | | | |
|---|---|---|---|
| 2,852,459 | 9/1958 | Williamson | 176/19 LD |
| 2,974,094 | 3/1961 | Paul | 176/19 LD |
| 3,762,993 | 10/1973 | Jones | 176/19 LD |
| 3,801,441 | 4/1974 | Jones | 176/19 LD |
| 3,941,652 | 3/1976 | Delisle et al. | 176/19 LD |
| 4,147,587 | 4/1979 | Utamara et al. | 176/19 LD |

FOREIGN PATENT DOCUMENTS

| | | | |
|---|---|---|---|
| 49-70400 | 6/1974 | Japan | |
| 51-676 | 1/1976 | Japan | 176/19 LD |
| 51-22993 | 2/1976 | Japan | 176/19 LD |
| 51-54191 | 5/1976 | Japan | 176/19 LD |

OTHER PUBLICATIONS

Nucleonics (7/61), vol. 19, No. 7, pp. 84,86,89, Osborene.

Primary Examiner—Sal Cangialosi
Attorney, Agent, or Firm—Craig and Antonelli

[57] ABSTRACT

An apparatus for detecting failure of the nuclear fuel rod has an outer cap and 16 (sixteen) inner caps. In checking for any faulty fuel rods, the outer cap is placed to cover the upper ends of 16 (sixteen) fuel assemblies mounted in the reactor core, while the inner caps in the outer cap are disposed on corresponding one of the fuel assemblies. To the outer cap are attached 4 (four) air supplying hoses. The inner caps receive corresponding one of 16 sampling tubes attached to the outer cap, and coolant sampling hoses are connected to the sampling tubes. A bundle member is fixed to the center of the upper surface of the outer cap. The four air supplying hoses and 16 coolant sampling hoses are fixed to the bundle member. The bundle member has a handle attached thereto.

6 Claims, 10 Drawing Figures

APPARATUS FOR DETECTING FAILURE OF THE NUCLEAR FUEL ROD

BACKGROUND OF THE INVENTION

The present invention relates to an apparatus for detecting the failure of nuclear fuel.

Generally, the reactor core of a boiling water reactor is loaded with a multiplicity of fuel assemblies each of which is constituted by an upper and a lower tie plates, a channel box and a plurality of fuel rods which are supported at their both ends by the upper and the lower tie plates and are accommodated in the channel box.

In case of a failure of the fuel rod or rods of the fuel assembly mounted in the reactor core, fission products such as radioactive iodine, xenon, krypton and the like are discharged into the cooling water circulated through the reactor core. If the nuclear reactor operates continuously with its reactor core loaded with fuel assemblies including failed fuel rod or rods, the contamination in the reactor caused by the fission products will be serious so as to hinder the work for the protective maintenance of the nuclear reactor.

To avoid this, the fuel assemblies with which the reactor core is loaded are periodically checked to detect the failure of the fuel rods.

If a failure is detected, the fuel assembly containing the failed fuel rod is withdrawn from the reactor core, and a new fuel assembly is placed instead of the failed fuel assembly.

The specification of U.S. Pat. No. 4,147,587 discloses a method of detecting failure of fuel rods in a boiling water reactor. According to this method, the detection of a faulty fuel rod is achieved by using a cap system adapted to be mounted on the fuel assemblies. The cap system includes a cap portion having a plurality of caps each having a square cross-section and adapted to be mounted on the fuel assemblies, and water sampling tubes. Four water sampling tubes are arranged above the cap portion. Each water sampling tube is inserted into the corresponding cap. An air supply port is formed through the upper wall of each cap. Also, a handle is attached to the upper surface of the cap portion.

The check of the fuel assemblies is made in the following manner. As the operation of the boiling water reactor is stopped, the upper lid of the reactor pressure vessel is removed. Then, the handle of the cap system is grasped by the gripper of a fuel replacement device which is adapted to move the cap portion of the cap system to a position above the fuel assembly to be checked. Then, the lower end of the cap portion of the cap system is seated on an upper grid plate which supports the upper ends of the fuel assemblies in the reactor. Then, air is supplied into the cap portion through the air supply port. The supply of the air is ceased when the water level in the cap portion has come down below the upper end of the channel box. Thereafter, the cooling water in the fuel assembly is picked up by means of the water sampling tube and a sampling hose connected to the latter, and the level of radioactivity of the sample water is measured. The judgement as to whether there is any faulty fuel rod is made in accordance with the result of the measurement of the radioactivity level.

Thus, four fuel assemblies are checked by the cap system having four caps. The check of 400 to 800 fuel assemblies in the reactor core with this system, however, requires an impractically long time, which in turn constitutes one of the factors which hinder a prompt restart of the nuclear reactor, and thereby cause a lower plant factor for the nuclear reactor.

SUMMARY OF THE INVENTION

It is, therefore, an object of the invention to improve the plant factor of the nuclear reactor.

It is another object of the invention is to improve the stability of a cap system.

It is still another object of the invention to precisely position an inner cap member provided in a cap system.

According to the invention, there is provided an apparatus for detecting failure of a fuel rod, having a cap adapted to cover the upper ends of a plurality of fuel assemblies, a plurality of coolant sampling tubes attached to the cap and adapted to be inserted into the fuel assemblies, a gas supply pipe connected to the cap and a member attached to the side of the cap opposite to the fuel assemblies and adapted to bundle coolant sampling pipes connected to the coolant sampling tubes and the gas supplying pipe.

DESCRIPTION OF THE PREFERRED EMBODIMENTS

Figure 1:
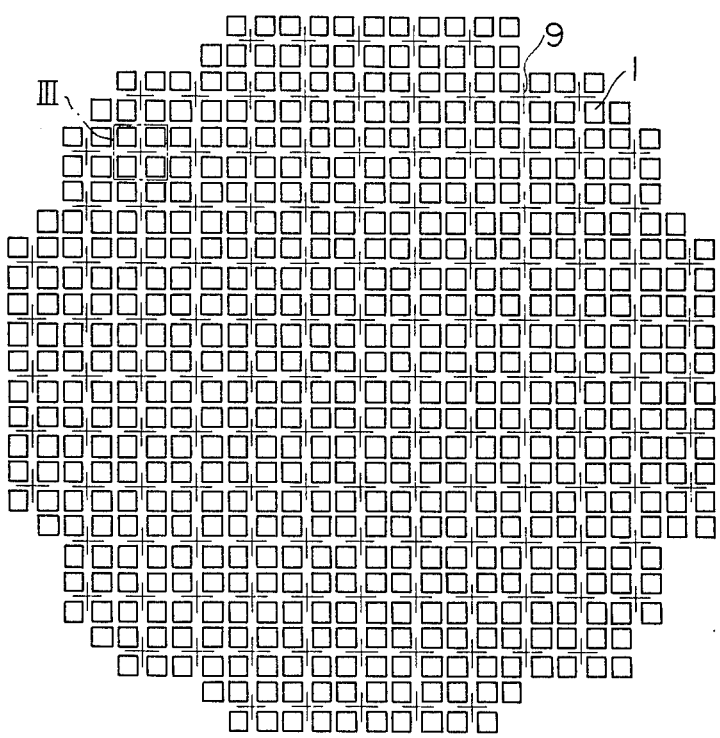
FIG. 1 is a schematic plan view of the nuclear reactor core of a boiling water reactor.

A typical boiling water reactor has a reactor core constituted by a multiplicity of fuel assemblies 1 disposed regularly in a manner shown in FIG. 1. The number of the fuel assemblies varies, usually 400 to 800, depending on the thermal output of the reactor. In FIG. 1, a reference numeral 9 denotes control rods each of which has a cruciform cross-section. The fuel assemblies 1 are disposed so that they are located adjacent to one of these control rods.

Figure 2:
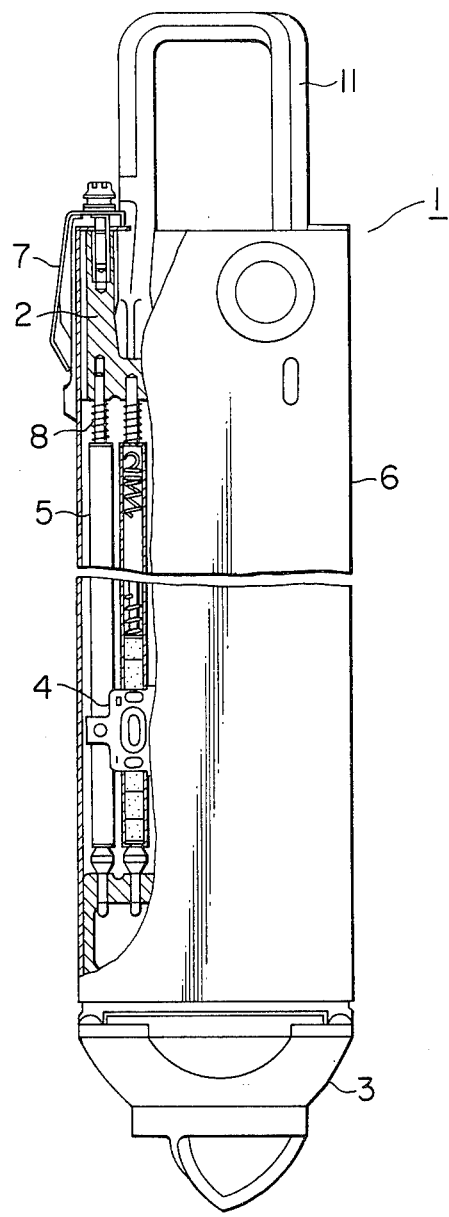
FIG. 2 is an illustration showing a fuel assembly with which the reactor core is loaded.

Each of the fuel assemblies constituting the reactor core of the boiling water reactor has a construction shown in detail in FIG. 2. More specifically, each fuel assembly 1 is constituted by an upper tie plate 2, a lower tie plate 3, a plurality of fuel rods spaced from one another by spacers 4, a channel box 6 housing the fuel rods 5, and a channel fastener 7 made of an elastic material and is adapted to fix the channel box 6 to the upper tie plate 2, as well as to preserve a suitable gap between adjacent fuel assemblies 1 when the fuel assemblies are disposed in the reactor core. A reference numeral 8 denotes an expansion spring which is interposed between the fuel rod 5 and the upper tie plate 2, while a reference numeral 11 denotes a handle.

Figure 3:
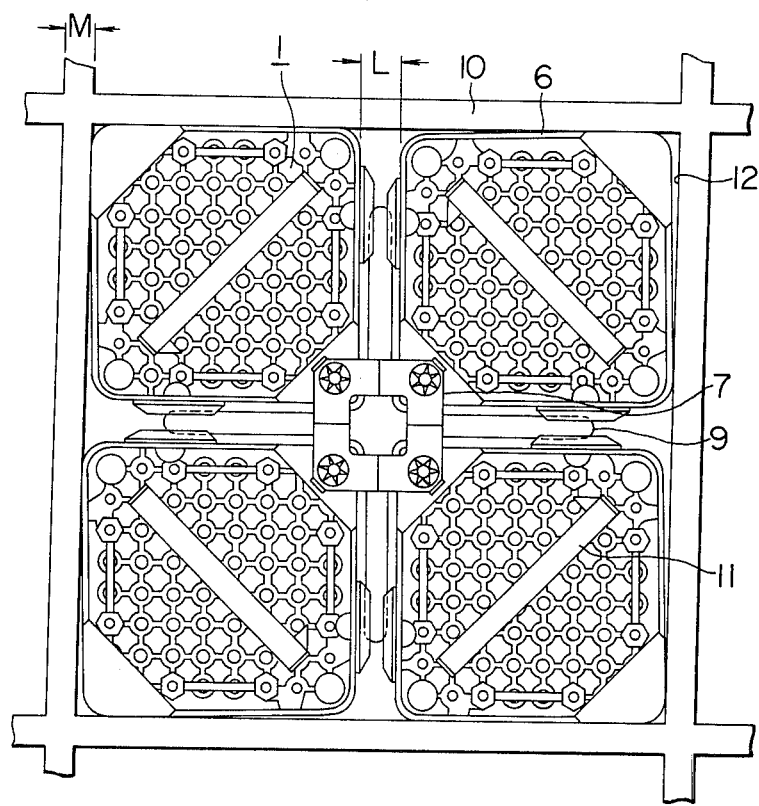
FIG. 3 is an enlarged view of a portion marked at III in FIG. 1.

FIG. 3 shows the detail of a part of the nuclear reactor core as marked at III in FIG. 1. One unit cell is constituted by four fuel assemblies 1 and one cruciform control rod 9. This unit cell is loaded so as to be received by a square-shape upper grid plate 10 disposed in the vessel of the reactor. The distance L between adjacent fuel assemblies 1 in each unit cell is maintained by the channel fasteners 7 of the four fuel assemblies, and permits passage for the control rod 9. On the other hand, the distance M between the adjacent unit cells is maintained by means of the upper grid plate 10.

Figure 4:
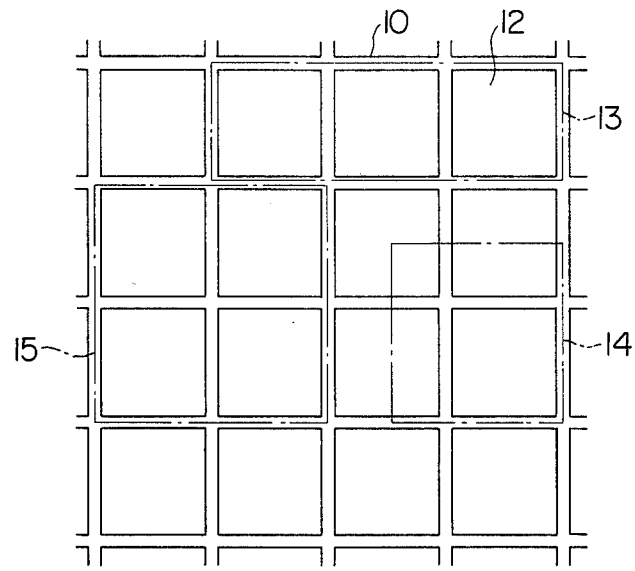
FIG. 4 is a plan view of a part of an upper grid plate.

The upper grid plate 10 disposed at an upper part of the core of the nuclear reactor has a construction as shown in detail in FIG. 4.

As will be seen from FIG. 3, four fuel assemblies 1 are disposed in one square bore 12 of the upper grid plate 10. An outer cap of a device for detecting failures of nuclear fuel rods has such a size that, as shown in FIG. 4, the whole part of the lower end of the outer cap is surely seated on the upper grid plate 10. To this end, it is necessary that the outer cap has a size which is n times as large as that of the bore 12 (n being an integer), as shown by one-dot-and-dash line 13. If the outer cap has a size for covering nine fuel assemblies 1 as shown by one-dot-and-dash line 14, it is possible to locate a part of the lower end of the outer cap on the upper grid plate 10, but the part of the lower end of the outer cap located at the center of the bore 12 cannot be lowered because such a portion is interferred with the channel fastener 7. In this case, the outer cap is not possible to isolate the upper parts of the adjacent fuel assemblies so that the failure of the fuel rod cannot be ascertained even by the supply of the air into the outer cap.

For obtaining a shorter inspection time for detecting the failure of the fuel rods than that performed by the conventional detecting system, it is essential to select the size of a shipper cap taking into account the above-described conditions.

It is conceivable to select the size of the shipper cap as shown by the one-dot-and-dash line 13 so that 12 fuel assemblies 1 may be simultaneously checked. The size of the line 13, however, is disadvantageous in that it is difficult to maintain the balance because of the rectangular shape, so that the shifting of the shipper cap and the seating of the same on the upper grid plate 10 are made difficult.

This is caused by the fact that the coolant sampling hoses, as well as the air supply hoses connected to the air supply port, extend upwardly, and that the shipper cap has a rectangular shape. This problem can be overcome by adopting a square cross-section of the shipper cap.

An excessively large shipper cap is difficult to handle, even if it has a square cross-section. For instance, assuming here that a shipper cap has a size to cover 36 fuel elements 1 which are seated on the upper grid plate 10, extending over 9 bores (3 columns and 3 lines), the weight of the shipper cap is too much to be easily moved by the existing fuel replacement device. Namely, in this case, a fuel replacement device having a larger size and power is specially required.

The practical solution in view of the above-described consideration has led to a conclusion that the square shipper cap most preferably has a size to cover 16 fuel assemblies in 4 bores (2 columns and 2 lines) as shown by one-dot-and-dash line 15. In order to increase the stability of the shipper cap to obtain a good balance of weight during shifting thereof, a bundle member for the sampling tubes and the gas supplying hoses is attached preferably to the central portion of the upper surface of the shipper cap.

Figure 6:
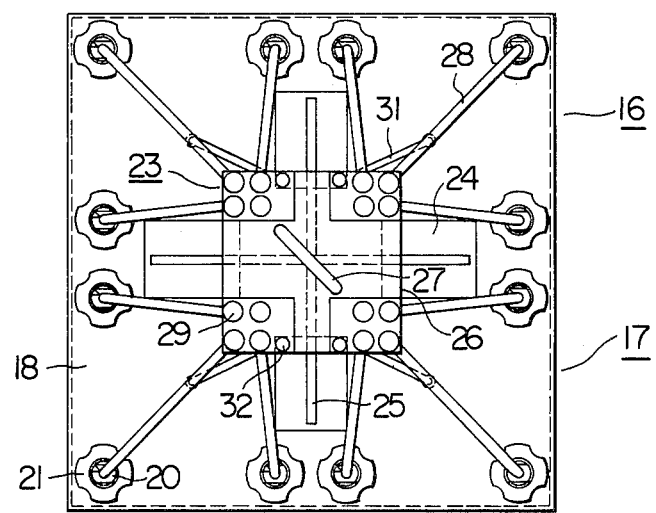
FIG. 6 is a plan view of the apparatus shown in FIG. 5.
Figure 5:
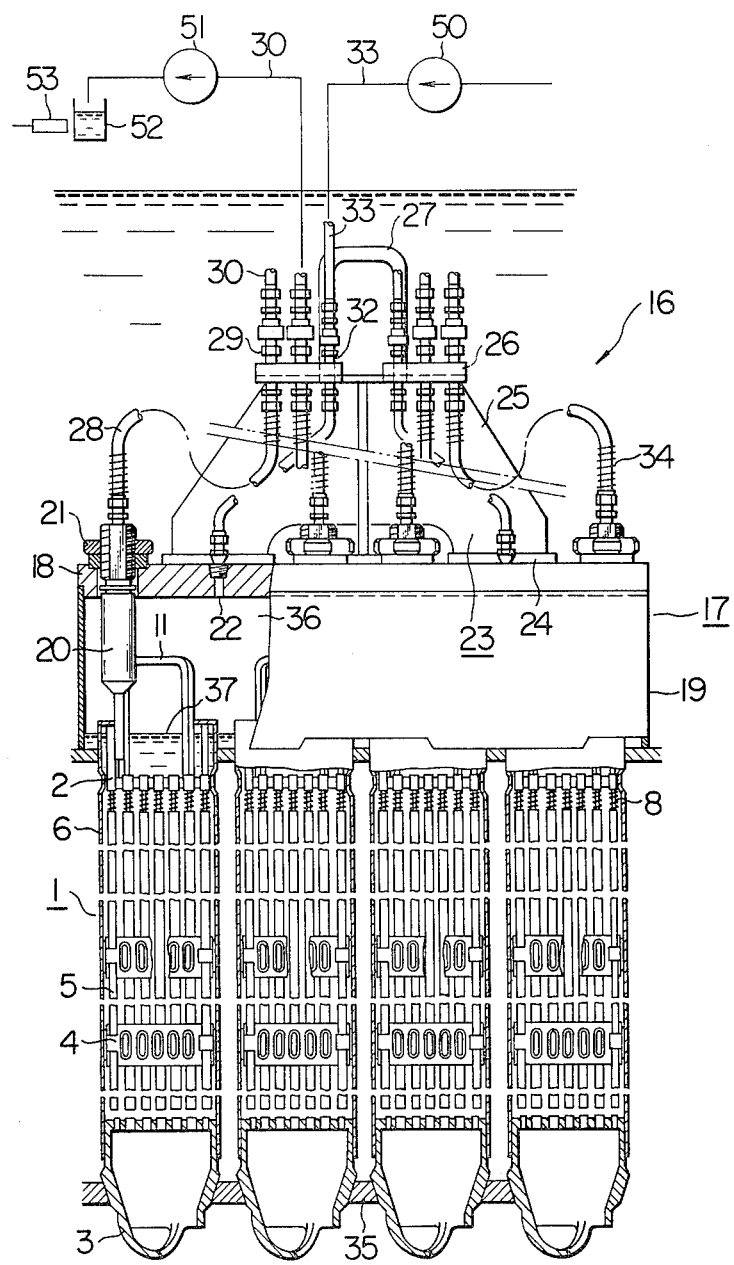
FIG. 5 is a side elevational view of an apparatus for detecting failure of a fuel rod, constructed in accordance with a preferred embodiment of the invention.

Hereinafter, a description will be made as to an apparatus for detecting failure of fuel rods constructed in accordance with a preferred embodiment of the invention, with specific reference to FIGS. 5 and 6.

The shipper cap 16 constituting the apparatus for detecting the failure of fuel rod is constituted by a cap 17, sampling tubes 20 and a bundle member 23. The cap 17 has an upper plate 18 and side walls 19 attached to the lower side of the upper plate 18 and constituting a rectangular sleeve or cylinder having a square cross-section. There are provided 16 sampling tubes 20. Each sampling tube 20 is attached to the upper plate 18 through a corresponding sampling tube fixture port 21 provided in the upper plate 18.

Four air supplying ports 22 are formed through the upper plate 18. The bundle member 23 is attached to the central portion of the upper surface of the upper plate 18, and is constituted by a reinforcement plate 24, a stem 25 having a cruciform cross-section and a tube fixing plate 26. The reinforcement plate 24 and the tube fixing plate 26 are attached to the lower and upper ends of the stem 25, respectively. The reinforcement plate 24 is also attached to the upper surface of the upper plate 18. A handle 27 is attached to the central portion of the upper surface of the tube fixing plate 26. In each of the four corners of the tube fixing plate 26, provided are four plugs 29 for sampling hoses and one plug 32 for the air supplying hose. These plugs in the four corners are disposed symmetrically with respect to the center line of the upper plate 18. The sampling hoses 28 are attached to corresponding sampling tubes 20. As will be apparent from FIGS. 5 and 6, the sampling hoses 28 in four groups each containing four hoses are connected at their other ends to the lower ends of the plugs 29. To the upper ends of the plugs 29, connected are sampling hoses 30. Thus, there are provided 16 sampling hoses 30 which are connected to a water sampling device installed on the uppermost floor of the building accommodating the nuclear reactor. Each of the air supplying hoses 31 is connected at its one end to the corresponding each air supplying port 22 and its other end to the lower end of the plug 32. Air supplying hoses 33 are connected at their upper ends to a blower (not shown) installed on the uppermost floor and at their other ends to the upper ends of corresponding plugs 32 for the air supplying hoses. The sampling hoses 28 and the air supplying hoses 31 are reinforced by spiral metal wires 34 against oscillation.

The check of the fuel assemblies for detecting the faulty fuel rod is made after stopping of the operation of the nuclear reactor. After the stopping of the operation, the upper lid of the nuclear reactor container is removed and cooling water is supplied into the container to a level near the level of the uppermost floor of the nuclear reactor building. The fuel assemblies 1 are loaded in the core of the nuclear reactor and the lower portions thereof are fixed to a core support plate 35 which is attached to the inside of the nuclear reactor vessel. As stated before, the upper end portions of the fuel assemblies 1 are received in the bores 12 of the upper grid plate 10 so as to be held by the latter. The distance between the level of the cooling water surface and the upper ends of the fuel assemblies placed in the reactor core is about 15 m. The shipper cap 16 is gripped at its handle 27 by the gripper of the fuel replacement device, and is moved into the cooling water from the uppermost floor of the nuclear reactor building, and is lowered and moved to a position overlying the 16 fuel assemblies to be checked. As the shipper cap 16 is moved to that position, it is lowered to be seated on the upper grid 10. In this state, each of 16 sampling tubes 20 is inserted into corresponding one of 16 fuel assemblies 1. Then, a blower 50 mounted on the uppermost floor is started to supply air into the shipper cap 16 through the air supplying hoses 33 connected to the air supplying ports 22. The air supplied into the shipper cap 16 forms an air plenum 36 in the latter.

When the water surface 37 in the shipper cap 16 has been lowered to a level which is lower than the upper end of the channel box 6 by a predetermined distance, the supply of the air into the shipper cap 16 is stopped. In this state, the upper ends of the fuel assemblies are isolated from one another by the air plenum 36.

The apparatus is then made to stand still in this state for a predetermined time. If there is any faulty fuel rod 5 in the fuel assembly 1, radioactive fission products such as I, Xe and Kr produced as a result of fission of the uranium-235 in the fuel rod 5 are released to the outside of the fuel rod 5. The released fission products are diffused in the cooling water in the fuel assembly 1 and is spread to the upper part of the cooling water.

After lapse of a predetermined time, a sucking pump 51 installed on the uppermost floor and connected to the sampling hoses 30 is started to sample the cooling water residing in the upper end portion of the cooling water. The sampled cooling water is sucked into a vessel 52, through the sampling hoses 28 and 30. Then, the radioactivity of the sample water is measured by means of a radioactivity sensor 53. If there is a faulty fuel rod 5, the level of the radioactivity is rendered high because of the fission products contained by the sample water. Thus, a judgement is made as to whether the checked fuel assembly 1 includes any faulty fuel rod 5.

In the described embodiment, the shipper cap 16 is square-shaped and has a size large enough to permit the inspection of 16 fuel assemblies at a time. Therefore, the stability of the shipper cap 16 is improved to facilitate the handing thereof during the shifting, and the time required for the check of all fuel assemblies loaded in the reactor core is remarkably shortened, which apparently increases the rate of operation of the nuclear reactor.

It is also to be noted that, since the sampling hoses and air supplying hoses are bundled and fixed by the bundle member 25, the unbalance of weight of the shipper cap 16 caused by oscillation of these hoses during the shifting is eliminated. This feature on the other hand permits a prompt shifting of the shipper cap 16, so that the time required for the detection of the faulty fuel rod is further shortened to provide a further improved plant factor of the nuclear reactor.

Figure 7:
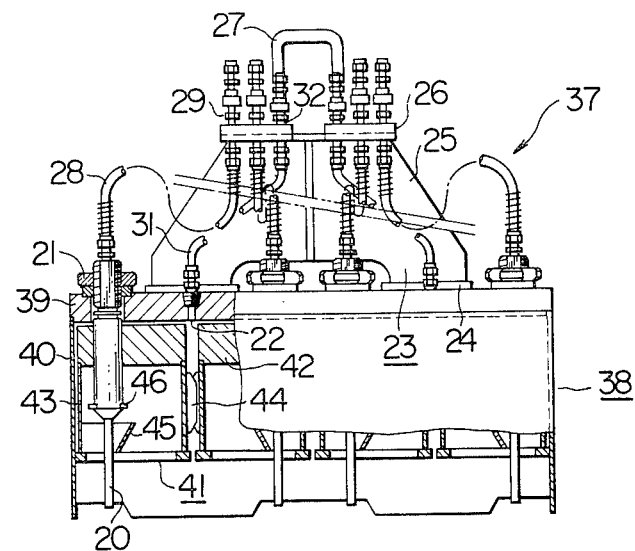
FIG. 7 is a side elevational view of an apparatus for detecting failure of a fuel rod, constructed in accordance with another embodiment of the invention.
Figure 8:
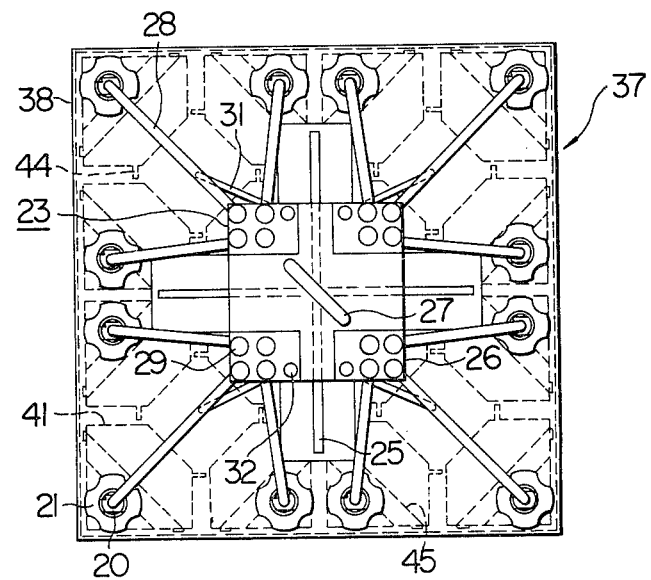
FIG. 8 is a plan view of the apparatus shown in FIG. 7.

FIGS. 7 and 8 show another embodiment of the invention in which the same reference numerals are used to denote the same parts and members as those of the first embodiment. This second embodiment differs from the first embodiment only in the points specifically mentioned below.

In this second embodiment, a shipper cap 37 is constituted by an outer cap 38, inner caps 41, sampling tubes 20, the bundle member 23 and so forth. The outer cap has a square upper plate 39 and side walls 40 in the form of a square cylinder, while the inner cap 41 includes an upper plate 42 and a cylindrical side wall 43. The upper plates 39 and 42 are attached to the upper ends of side walls 40 and 43, respectively. The reinforcement plate 24 of the bundle member 23 is attached to the center of the upper surface of the upper plate 39.

The upper plate 39 is provided also with the sampling tube attaching port 21 and the air supplying ports 22.

The outer cap 38 accomodates 16 inner caps 41, as shown in FIG. 8. Each inner cap 41 receives one sampling tube 20. A plate-shaped guide 44 is attached to the outer surface of the side wall of each inner cap 41. The plate-shaped guide 44 is disposed in each of the space between adjacent inner caps 41.

Further, the plate-shaped guide 45 is disposed in each of the inner caps 41.

For detecting the faulty fuel rod, the lower ends of the outer cap 38 and the inner caps 41 are seated on the upper end of the upper grid plate 10 and the channel box 6. The fuel assemblies exhibit different expansions in the longitudinal direction depending on the position of the fuel assemblies in the reactor core and the degree of burn-up. However, since the inner caps 41 are allowed to slide along the sampling tubes 20, the lower ends of the inner caps 41 are always kept in contact with the upper ends of the channel box 6 so as to maintain adjacent fuel assemblies in the state isolated from one another. A reference numeral 46 denotes a stopper for preventing the inner cap 41 from dropping.

The air supplied into the outer cap 38 flows into the inner caps 41 through the gaps formed between the upper plates 42 and the sampling tubes 20. The plate-like guides 44 function to correctly locate the inner caps 41 thereby to make sure of the seating of the inner caps on the channel box 6. Each plate-like guide 45 is adapted to guide the handle 11 of the fuel assembly.

The operation of this embodiment for detecting the faulty fuel rod is made substantially in the same manner as the first embodiment. This second embodiment can achieve the same advantage as that achieved by the embodiment shown in FIG. 5.

Figure 9:
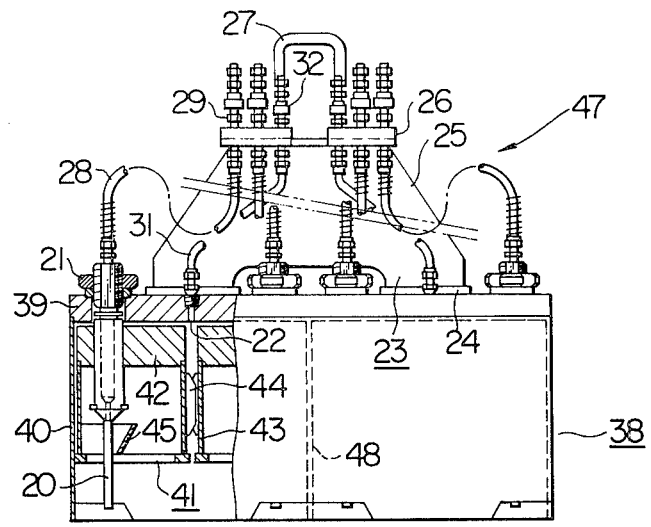
FIG. 9 is a side elevational view of an apparatus for detecting failure of a fuel rod, constructed in accordance with still another embodiment of the invention.
Figure 10:
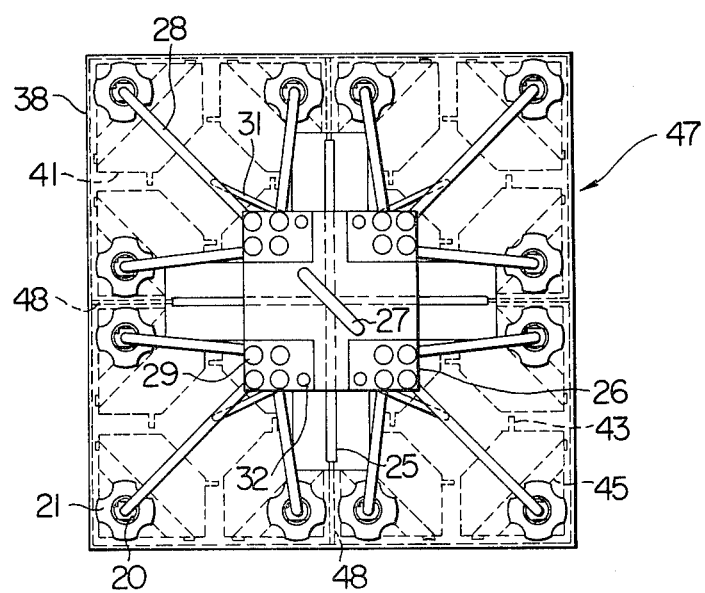
FIG. 10 is a plan view of the apparatus shown in FIG. 9.

FIGS. 9 and 10 show still another embodiment of the invention in which the same reference numerals are used to denote the same members or parts to those of the preceding embodiments. A description will be therefore focussed on the point of difference.

The shipper cap 47 of this embodiment has an outer cap substantially identical to that 37 shown in FIG. 7 but provided therein with a cross-shaped partition member 48. This partition member 48 divides the space in the outer cap 38 into four small sections each of which receives the corresponding one of four inner caps 41. By so doing, the inner caps 41 can be positioned with greater precision than in the embodiment shown in FIG. 7.

The operation of this embodiment for detecting the faulty fuel rod is made substantially in the same manner as the preceding embodiments. Also, an effect equivalent to that achieved by the embodiment shown in FIG. 7 is obtained.

By providing a bundle member in the manner described in connection with the preceding embodiments, it is possible to improve the stability of the shipper cap having a rectangular cross-section as illustrated by the one-dot-and-dash line 13 in FIG. 4.

Although not shown in the attached drawings, it is possible to attach warm water supplying pipes as shown in the specification of U.S. Pat. No. 4,147,587 to the shipper cap. More specifically, in FIG. 15 of this U.S. patent illustrates, 16 pieces of warm water supplying pipes which are attached through the upper wall of the cap 17 of the shipper cap 16. These warm water supplying pipes are fixed to the bundle member on the upper surface of the cap 17, in the same manner as the coolant sampling hoses and air supplying hoses.

In case of the shipper caps 37 and 47 shown in FIGS. 7 and 9, 16 warm water supplying pipes are extended through the upper wall of respective outer caps. Each of these 16 warm water supplying pipes is inserted into corresponding one of the inner caps. These warm water supplying pipes are fixed to the bundle member on the upper surface of the outer cap. The attaching of the warm water supplying pipes to the outer cap tends to cause an unbalance of weight of the outer cap. However, since the warm water supplying pipes are fixed to the bundle member, the unbalance of weight of the outer cap is avoided to ensure a sufficient stability of the latter during the handling.

As detailed in the specification of U.S. Pat. No. 4,147,587, these warm water supplying pipes are used to feed into the fuel assemblies to be checked a warm water having a temperature higher than that of the temperature residing in the fuel assembly.

The discharge of fission products from the faulty fuel rod is promoted by the supply of the warm water into the fuel assembly. In consequence, the time required for the checking of the fuel assemblies is shortened and the accuracy of detection is improved considerably.

As has been described, according to the invention, the stability of the apparatus for detecting the failure of fuel rod is remarkably improved and the time required for the detection is very much shortened, which in combination contribute to the improvement in the plant factor of the nuclear reactor.

We claim:

1. An apparatus for detecting a failure of a fuel rod comprising: an outer cap adapted to cover the upper end portions of fuel assemblies mounted in a core of a nuclear reactor and containing therein coolant; a plurality of inner caps disposed in said outer cap, and arranged to cover said upper end portions of said associated fuel assemblies, respectively; means, disposed in said outer cap, for guiding said inner caps so as to enable said inner caps to move up and down with respect to said outer cap independently from one another; a plurality of coolant sampling tubes respectively attached to said inner caps and having opened ends inserted into said associated fuel assemblies; sucking means, attached to said coolant sampling tubes, for sucking coolant from said fuel assemblies; a gas supplying pipe connected to said outer cap and opening to a space defined by the surface of said outer cap confronting said fuel assemblies, and means for supplying a gas to said gas supplying pipe.

2. An apparatus as claimed in claim 1, wherein said cap is sized to just cover the upper ends of 16 fuel assemblies mounted in said reactor core, and is provided with 16 coolant sampling tubes.

3. An apparatus as claimed in claim 1, wherein said outer cap is sized to just cover the upper ends of 16 fuel assemblies mounted in said reactor core, and wherein 16 inner caps and 16 coolant sampling tubes are provided.

4. An apparatus as claimed in claim 1 or 2, wherein a bundle member is attached to the surface of said outer cap, and said coolant sampling tubes and said gas supplying pipe are bundled through said bundle member.

5. An apparatus as claimed in claim 1, wherein each of said inner caps is provided with a plate-like guide member adapted to guide said each inner cap along with a handle attached to each fuel assembly.

6. An apparatus as claimed in claim 1, wherein each of said inner caps has a lower portion engaging said upper end portion of a respective fuel assembly so as to isolate said fuel assemblies from one another.

* * * * *